(12) United States Patent
Stepanek

(10) Patent No.: US 9,095,121 B1
(45) Date of Patent: Aug. 4, 2015

(54) CAGE FOR ANIMAL PETS EMPLOYING ZEOLITE ELEMENTS TO ELIMINATE PET ODOR

(71) Applicant: Stephen Stepanek, Amherst, NH (US)

(72) Inventor: Stephen Stepanek, Amherst, NH (US)

(73) Assignee: White Cliff Pet Products, LLC, Milford, NH (US)

( * ) Notice: Subject to any disclaimer, the term of this patent is extended or adjusted under 35 U.S.C. 154(b) by 163 days.

(21) Appl. No.: 13/986,451

(22) Filed: May 6, 2013

(51) Int. Cl.
*A01K 1/01* (2006.01)
*A01K 1/02* (2006.01)

(52) U.S. Cl.
CPC ............. *A01K 1/0245* (2013.01); *A01K 1/0107* (2013.01)

(58) Field of Classification Search
CPC .............................. A01K 1/0107; A01K 1/032
USPC .................. 119/161, 165, 169, 171, 462, 479
See application file for complete search history.

(56) References Cited

U.S. PATENT DOCUMENTS

| | | | | |
|---|---|---|---|---|
| 4,546,727 A | * | 10/1985 | Andersen | 119/165 |
| 4,848,274 A | * | 7/1989 | Yananton | 119/169 |
| 5,224,975 A | * | 7/1993 | Purnell et al. | 96/108 |
| 2009/0205578 A1 | * | 8/2009 | Alves | 119/454 |

FOREIGN PATENT DOCUMENTS

WO    WO 2008084565 A1 *  7/2008  ............. A01K 1/015

* cited by examiner

*Primary Examiner* — Rob Swiatek
*Assistant Examiner* — Danielle Clerkley
(74) *Attorney, Agent, or Firm* — Stephen W. White; Stephanor Consulting Services, Inc.

(57) ABSTRACT

A cage for confining small animals in which Zeolite can be used to capture and contain offensive odors contained in the urine and feces of these animals. The cage comprises a top cage and a bottom container, wherein the bottom container has a top made from a fine mesh screen capable of holding the bedding and offing of the small animals. Under this screen, a pad containing a Zeolite in a drawer formed within the bottom container so that the Zeolite can be kept out of the area containing the small animal but may act to remove the aforementioned odors.

6 Claims, 3 Drawing Sheets

CAGE FOR ANIMAL PETS EMPLOYING ZEOLITE ELEMENTS TO ELIMINATE PET ODOR

RELATIONSHIP TO PREVIOUS INVENTIONS

This application is related to my previously filed application SS-100-A, U.S. Ser. No. 13/815,659, filed Mar. 15, 2013, dependent on Provisional U.S. Ser. No. 61/796,2012, now U.S. Pat. No. 8,869,745 B1 dated Oct. 28, 2014.

BACKGROUND OF THE INVENTION

1. Field of the Invention

This invention relates to the field of small animal pets such as hamsters, gerbils, rats, mice, ferrets, rabbits and the like This invention also relates to cages that hold these small animals in a manner to be enjoyed as pets and also in a manner in which they can be kept tidy and clean. This invention also relates to ensuring that odor from these pets can be kept to a minimum or even eliminated completely.

2. Description of the Prior Art

Cages and containers for these aforementioned small animal pets are legion in number. Some of these are made from wire and metal or from plastics and even some wood products. The small animal pets can be enjoyed by owners when they are visible and thus there are efforts to provide these cages and containers with open areas in which the small animal pets may play, eat, sleep and entertain the owners. Many of the hamsters and gerbils are kept in containers or cages that have multi-levels in which the animals may play and continue to entertain. In order to provide a safe and comfortable living space they owners usually provide a certain amount of bedding made from paper, wood chips, hay, straw, and even some kitty litter products such as those that contain clay elements. This bedding provides and warm and comfortable place for the small animal pets to bed down or to hide food products that the owner provides through small openings and feeding stations. Water is also provided with devices that allow the animal to lick the water in order to satisfy their thirst. When it is necessary, and this usually is on a daily basis, the owner of the pet will open a side door or take out a pan placed under the bottom of the cage, and remove the waste products for disposal. Then, fresh bedding and litters may be added back into the cage.

The problem lies in the frequent necessity of changing litter and bedding and in the smell and odor that emanates naturally from the small animal pet. These odors are particularly obnoxious when the small animal pet is a ferret, though most other small animals also contain odors that are not pleasant.

Thus, there is a continuing need to find means and methods for cleaning such small animal cages and containers and for preventing the build-up of obnoxious odors associated with the urine and feces of these pets.

SUMMARY OF THE INVENTION

It is an object of this invention to provide an element and process to ensure that small animal pet odors are contained and eliminated before they become a nuisance. These and yet other objects are achieved in a cage for small animal pets comprising a top and a bottom container, said bottom container having four sides, a bottom and a top, wherein said top of said bottom container comprises a metal screen capable of holding cage materials thereon and a tray element contained underneath said metal screen and wherein said tray contains a bag having a top element made from liquid transmitting, non-woven material and a bottom element made from non-liquid transmitting, non-woven material and wherein said bag contains a natural Zeolite, micro porous volcanic material sealed within said top and said bottom elements.

DETAILS OF THE INVENTION

Figure 1:
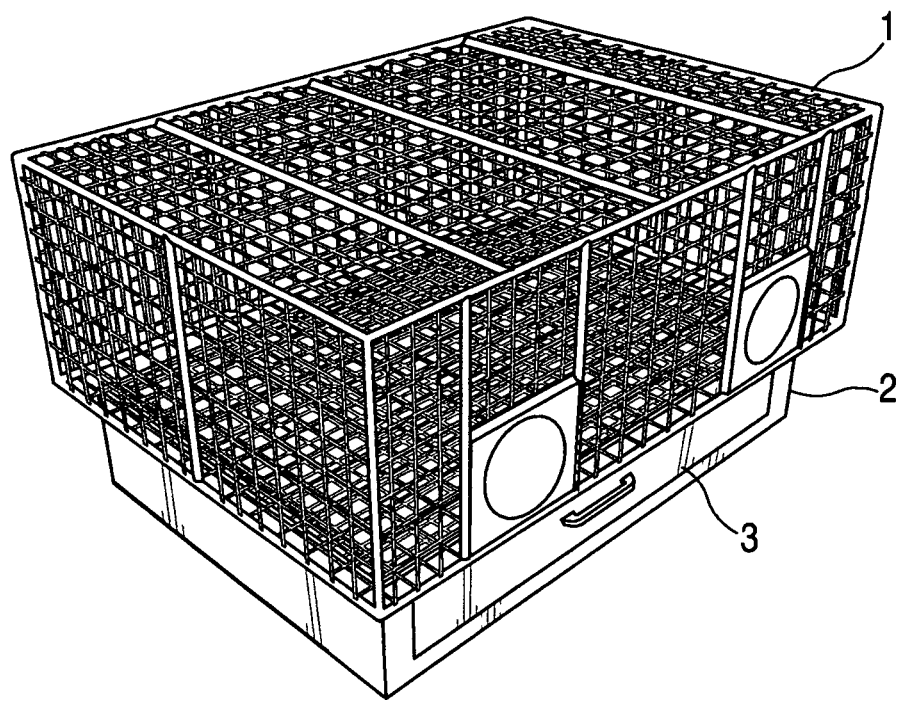
FIG. 1 is a showing of a simple cage designed for small animal pets available in the prior art. This element contains a top cage and a lower container and a drawer within said lower container.

Looking now at the drawings, which essentially describe the metes and bounds of this invention but to which the invention is not limited, FIG. 1 is a showing of a typical prior art cage to contain small animals pets such as gerbils, hamsters, etc. wherein 1 is a cage top, 2 is a lower container having four sides, a bottom and open top, wherein said lower container connects to said cage top by connections over said open top thereof. Shown in figure is a drawer 3 permitting access to any materials that may need to be removed therefrom, such as used bedding, dropped foods, etc.

Figure 2:
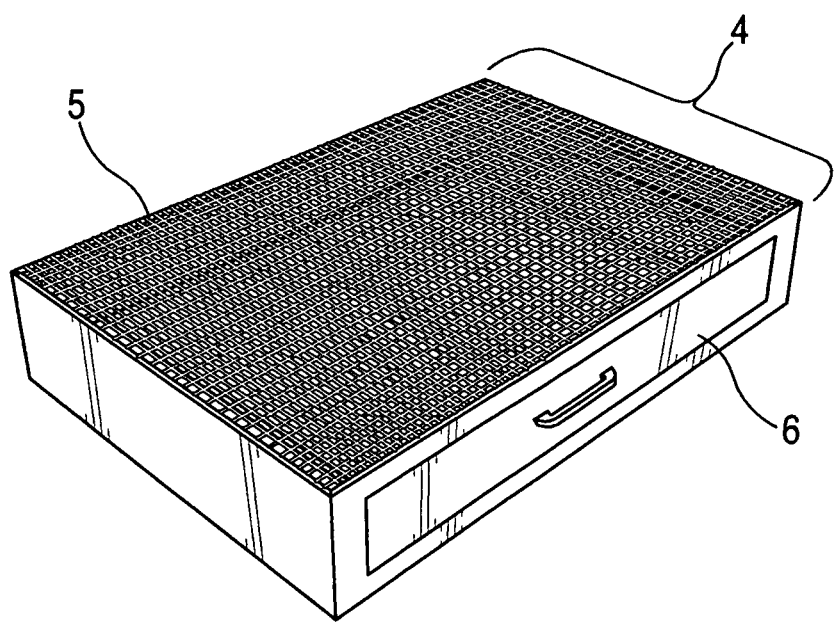
FIG. 2 is the lower container of a cage of this invention and does not show the top cage associated therewith but also has a drawer element contained therein.

FIG. 2 shows the lower container 4 of a cage designed for this invention. The top cage element is not shown herein. This lower container comprises four sides, a bottom and an open top covered by a metal screen 5. A top cage will be fastened over this metal screen in a full showing of the cage of this invention. A drawer front 6 is shown in this bottom section also.

Figure 3:
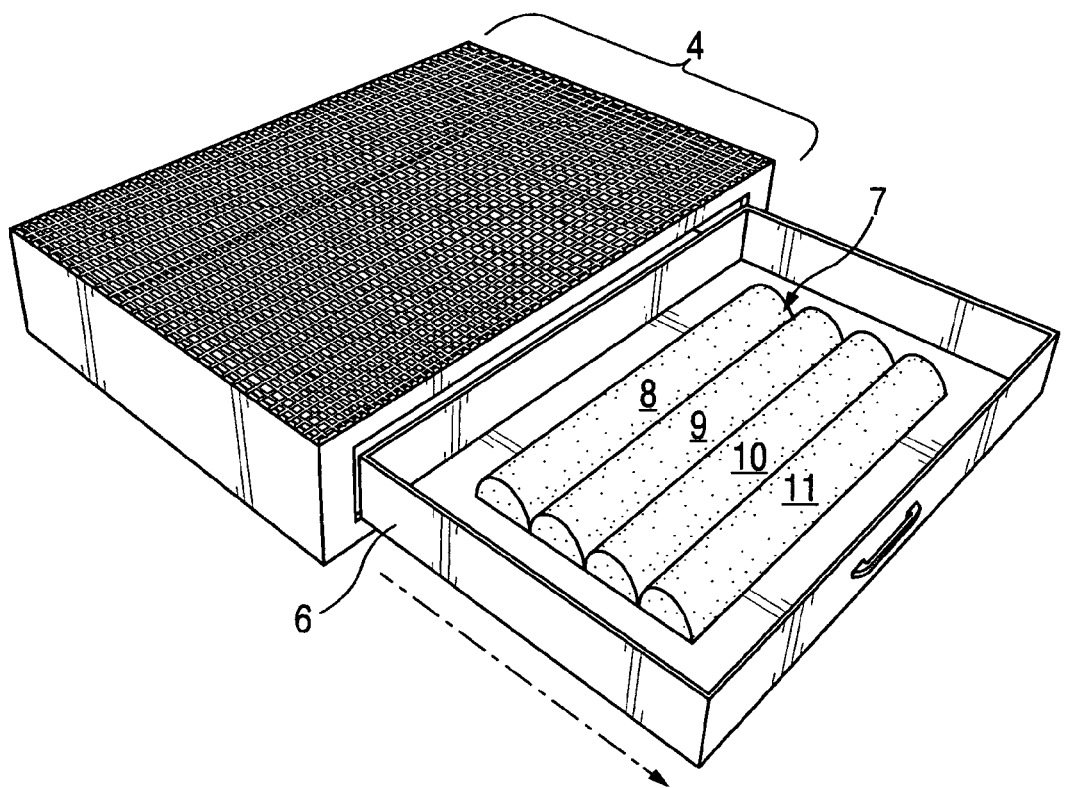
FIG. 3 is the lower container from FIG. 2 showing the drawer open and wherein said drawer contains a bag contain Zeolites.

FIG. 3 is the same lower container of FIG. 2 wherein said drawer element 6 is shown in an open direction following the arrow shown in this figure. A bag element 7 having four pouches 8-11 containing Zeolite material which can absorb animal odors emanating from the urine and feces from the contained animal (not shown).

Figure 4:
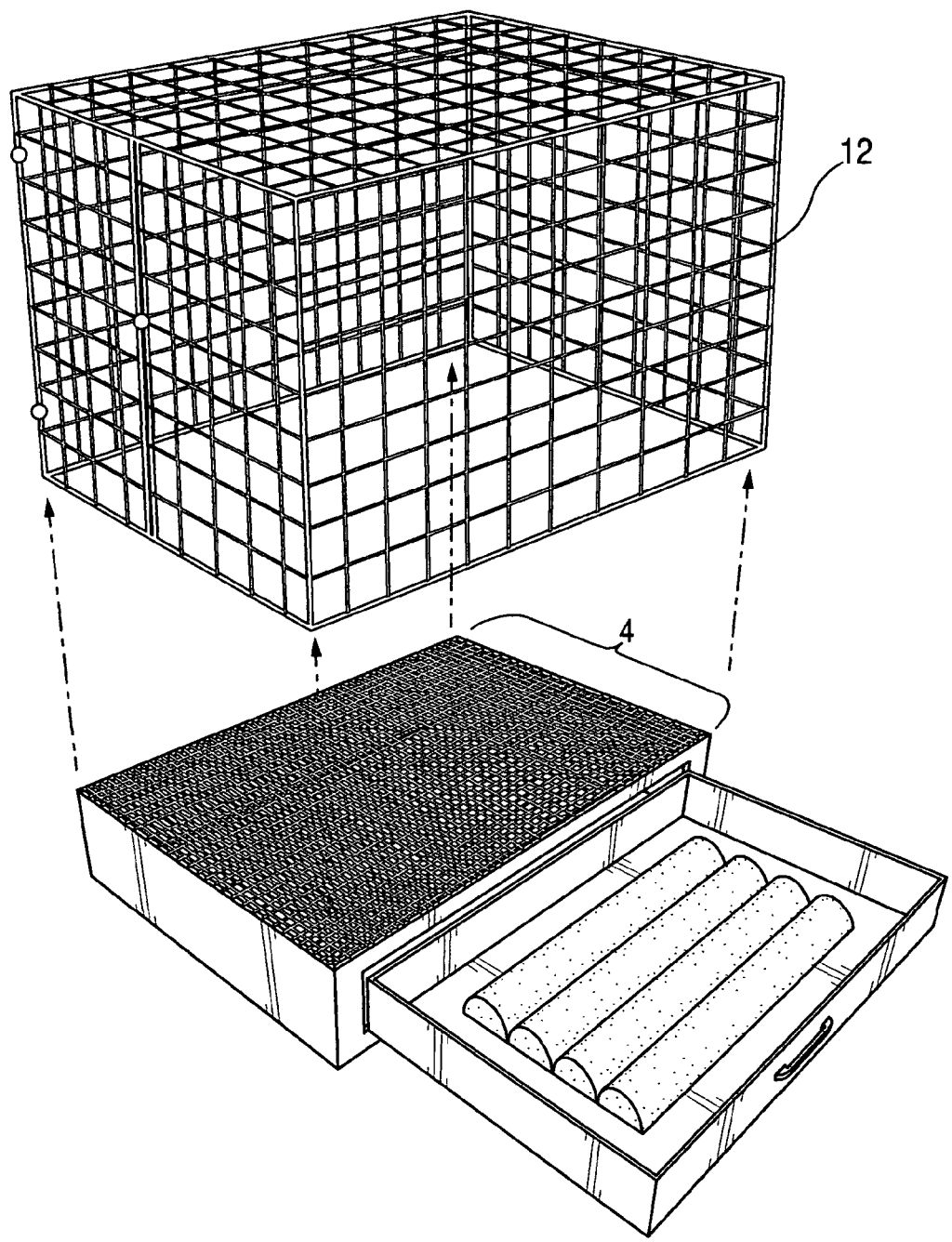
FIG. 4 is the lower container from FIG. 3 but has a top cage element which can be placed over said lower container and wherein the bag in made into pouches.

FIG. 4 shows the animal cage of this invention wherein the lower container is identical to that described in FIG. 3 but having a cage element 12 designed to drop down over said lower container along the dotted lines shown thereon.

The screen that is placed down over the top of the bottom container is an important feature of this invention. The screen provides a floor for the bedding and litter that will be contained therein as the cage or container is set on top of the bottom container to form the final cage or container for the small animal pet. The range of screen sizes includes 0.20"× 0.20" to 1.0"×10" with 0.14×0.18" being preferred. It should be realized that the screen should prevent large solid matter contained within the bottom container including bedding and other matter should be kept on top and only moisture NS vapor products developed during the habitation of the animal contained therein should be able to pass. These products will be adsorbed by the bag containing Zeolite products that are contained in the tray below. The bottom container can made of a number of materials including metals, plastics, etc. The screen element that is the top of this bottom container should be made from metals that are not easily subject to rust. Metals such as aluminum, stainless steel are among those imagined to function easily herein.

The bag described within this invention is a novel means of using very effective Zeolites to capture and contain the odiferous products of animal waste. Zeolites may be costly to use as a complete litter material. Also the absorption of water is not as great as the absorption of oil products for which Zeolites are customarily used. As can be clearly seen from the description and figures above the bag or pad that is used to contain the limited amount of the Zeolite is sealed on three sides first, then the Zeolite is placed within and the fourth side sealed firmly in a like manner. "Zippering" as is conventional in the art of food bags and containers and the like may also be used which will then permits the user to withdraw the bag or pad from the tray and dump the contents on to a garden of any time. The ammonia captured by the Zeolite will be slowly emitted and will act as a fertilizer for said garden. The Zeolite also will act as a garden soil extender since it is not an exceptionally good water absorber so does not clump up too much therein (an effective and useful "green" product involving recycle and garden use).

Typical and useful Zeolites are described in a product information sheet prepared by the St. Cloud Mining Company, P.O. Box 1670, Truth or Consequences, New Mexico and other manufacturers. This material is also known as Clinoptilolite and is eminently suitable for use within this invention, although other Zeolites (micro-porous volcanic materials described in the prior art) also can be used within the metes and bounds of my invention. It is assumed that the ammonia contained within the waste products either in a liquid form or a gaseous form is absorbed by the Zeolite and removed successfully. Thus, the odors normally associated with animal waste can be easily contained and eliminated. In addition, as mentioned above, the Zeolite materials hold this nitrogen function and can this be available as a fertilizer for distribution on a garden and the like. The Zeolite material itself is finely divided and can easily mix with the earth without any problems. A number of other litter elements are clay-containing material and this is not easily distributed through the earth.

When the bottom container is constructed as described above with the screen element forming the top thereof, and the tray installed with the pad of Zeolite, the next step is to install a suitable small animal cage on top thereof. These are standard cage materials including metals and plastics or plastic coated metals which can install in a normal manner over the bottom container. The cage can be inserted into small holes located around the perimeter of the bottom container and a series of small locking devices installed so as to prevent accidental separation of the cage top and the bottom container. Cage openings can also be provided along the cage top so access to the small animal and clean-out of litter materials and waste can be accomplished. These cage openings are standard elements and are usually locked from the outside.

As previously mentioned, a host of small animals are considered to be pets and are commonly owned by humans. They include ferrets, hamsters, gerbils, rabbits, mice and rats among others and the urine and feces given off can product noxious odors. The owners try many steps to prevent such odors without great success. Using the device of my invention the odors can be eliminated and both human owners and small animal pets are happy with the results. The use of these Zeolite elements as described herein and my previous patent filing above works well towards these objects. However, it is not useful to use the Zeolite as described previously since these small animals will be tempted to scratch up the Zeolite contained in the bag and the process will not proceed as described.

The Zeolite material can be added to the bag, wherein the top of the bag is made from water permeable non-woven material and the bottom of the bag is made from water impermeable non-woven material, as a single bag or wherein a number of tubes can be formed in a manner described above in the drawings. In this system we prefer a single bag. This bag is easily laid down in the tray underneath the screen element which forms the top of the bottom container. Then, the urine and any gaseous material eliminated by the small animal will pass down and be drawn into the Zeolite material which will adsorb and remove the odoriferous material therefrom. There is no other system that can perform as a unique odor controlling system for small animal pets.

I claim:

1. A container for confining small animal pets comprising a top cage and a bottom container, said bottom container having four sides, a bottom and a top, wherein said top of said bottom container comprises a meshed metal screen capable of holding cage materials thereon and a tray element contained underneath said meshed metal screen and wherein said tray contains a bag having a top element made from liquid transmitting, non-woven material and a bottom element made from non-liquid transmitting, non-woven material and wherein said bag contains only natural microporous volcanic zeolite sealed therein and wherein said top cage is removably connected to said bottom container.

2. The container of claim 1 wherein said meshed metal screen has a mesh size from 0.02"×0.02" to 1.0"×1.0".

3. The container of claim 1 wherein said bottom container is formed from a plastic.

4. The container of claim 1 wherein said small animals include, ferrets, hamsters, gerbils, rabbits, mice or rats.

5. The container of claim 1 wherein said meshed metal screen is a stainless steel screen and said mesh size is from 0.14"×0.18".

6. The cage of claim 1 wherein said zeolite is clinoptilolite.

* * * * *